US009091388B2

(12) United States Patent
Zribi et al.

(10) Patent No.: US 9,091,388 B2
(45) Date of Patent: Jul. 28, 2015

(54) MOUNTING ASSEMBLY WITH AUTOMATIC ACTIVATION FOR ALARM UNITS

(71) Applicant: WALTER KIDDE PORTABLE EQUIPMENT, INC., Mebane, NC (US)

(72) Inventors: Anis Zribi, Colorado Springs, CO (US); Ken Mott, Colorado Springs, CO (US); John Andres, Chapel Hill, NC (US); Dave Bush, Wheatland, WY (US)

(73) Assignee: WALTER KIDDE PORTABLE EQUIPMENT, INC., Mebane, NC (US)

( * ) Notice: Subject to any disclaimer, the term of this patent is extended or adjusted under 35 U.S.C. 154(b) by 76 days.

(21) Appl. No.: 13/894,765

(22) Filed: May 15, 2013

(65) Prior Publication Data

US 2014/0014793 A1    Jan. 16, 2014

Related U.S. Application Data

(60) Provisional application No. 61/671,580, filed on Jul. 13, 2012.

(51) Int. Cl.
| B42F 13/00 | (2006.01) |
| F16M 13/02 | (2006.01) |
| F16M 11/04 | (2006.01) |
| G08B 17/00 | (2006.01) |

(52) U.S. Cl.
CPC ............. *F16M 13/02* (2013.01); *F16M 11/041* (2013.01); *G08B 17/00* (2013.01); *Y10T 29/49963* (2015.01)

(58) Field of Classification Search
CPC . F16M 11/041; Y10T 29/49963; G08B 17/00
USPC ........... 340/630, 628, 629; 248/317, 342, 343
See application file for complete search history.

(56) References Cited

U.S. PATENT DOCUMENTS

| 5,021,677 | A | * | 6/1991 | Igarashi et al. ............... 250/574 |
| 5,563,766 | A | | 10/1996 | Long et al. |
| 5,577,696 | A | | 11/1996 | Kramer |
| 6,057,775 | A | | 5/2000 | Sakurai et al. |
| 6,351,219 | B1 | * | 2/2002 | Tanguay et al. ............... 340/630 |
| 6,522,254 | B1 | * | 2/2003 | Yamano ........................ 340/630 |
| 6,859,146 | B2 | | 2/2005 | McGreal et al. |
| 6,943,691 | B2 | | 9/2005 | Chambers |

(Continued)

FOREIGN PATENT DOCUMENTS

| DE | 20104385 U1 | 2/2002 |
| DE | 202004019995 U1 | 3/2005 |
| JP | 2003281641 A | 10/2003 |
| JP | 2008242771 A | 10/2008 |
| JP | 2008262395 A | 10/2008 |

*Primary Examiner* — Amy Sterling
(74) *Attorney, Agent, or Firm* — Cantor Colburn LLP (57) ABSTRACT

A mounting assembly and method for installing an alarm unit are provided. The mounting assembly includes a backplate having a front face and one or more keys extending from the front face, with the backplate being configured to be secured to a wall. The mounting assembly also includes a receptacle including one or more triggers electrically connected to a power source of the alarm unit, and defining one or more hanger recesses. The receptacle is configured to receive the one or more keys of the backplate in the one or more hanger recesses such that the one or more triggers are actuated by engagement with the one or more keys and relative movement between the backplate and the receptacle. The receptacle is physically secured to the backplate via engagement with the one or more keys.

12 Claims, 4 Drawing Sheets

(56) References Cited

U.S. PATENT DOCUMENTS

| | | | |
|---|---|---|---|
| 7,064,269 B2 * | 6/2006 | Smith | 174/50 |
| 7,287,738 B2 | 10/2007 | Pitlor | |
| 7,336,165 B2 * | 2/2008 | Fuchs | 340/506 |
| 8,004,416 B2 | 8/2011 | Bradley, Jr. et al. | |
| 8,089,769 B2 | 1/2012 | Casey | |
| 2009/0309743 A1 | 12/2009 | Tollman | |
| 2012/0043440 A1 | 2/2012 | Wilkowske et al. | |

* cited by examiner

MOUNTING ASSEMBLY WITH AUTOMATIC ACTIVATION FOR ALARM UNITS

CROSS REFERENCE TO RELATED APPLICATIONS

This application claims priority to U.S. Provisional Patent Application Ser. No. 61/671,580 filed on Jul. 13, 2012, the disclosure of which is incorporated by reference herein in its entirety.

BACKGROUND

Alarm units, e.g., smoke alarms, fire alarms, carbon monoxide alarms, and the like, typically require a power source to achieve desired monitoring and alerting functionality. Accordingly, some alarm units are hardwired to a municipal power grid, e.g., via in-wall wiring, conduits, etc. While such hardwiring can be convenient if planned for and wired during new construction, it is often expensive and inconvenient for installing new alarm units in existing structures. Furthermore, such hardwiring may be susceptible to power outages and thus back-up power sources may need to be employed, thus mitigating the advantages of hard-wiring.

Accordingly, some alarm units include independent, internal power sources. These self-contained alarm units can be installed, e.g., on a ceiling (or any other type of wall), often without external wiring. However, the power source contained in such alarm units, typically a standard battery, has a limited life and often requires replacement or recharging at a given interval (e.g., six months). In some situations, users may not change the batteries reliably, and thus the effectiveness of the self-contained alarms can be compromised. Moreover, even with such self-contained systems, installation can be time consuming. Each unit that is installed typically requires two or more screws to be driven into a wall, either through a backplate or into bare wall with a slight gap between the head of the screw and the wall, so as to be received into a slot formed in the back of the unit, thereby hanging the unit on the wall.

In response, long-life, sealed-compartment alarm units have been proposed, which have power sources that can last up to ten years or more. Automatic activation of such alarm units may be desirable, so as to avoid premature activation of these alarm units, prior to installation, as well as to avoid any potential for user error, incidental bumping, etc. affecting the power supply after installation. Further, a quick installation assembly may also be desirable, especially in situations in which multiple such units are being installed in a particularly building.

What is needed then is an alarm unit mounting assembly and method for installing an alarm unit that provides fast installation and/or automatic activation of the alarm unit.

SUMMARY

Embodiments of the disclosure may provide a mounting assembly for an alarm unit. The mounting assembly includes a backplate having a front face and one or more keys extending from the front face, with the backplate being configured to be secured to a wall. The mounting assembly also includes a receptacle including one or more triggers electrically connected to a power source of the alarm unit, and defining one or more hanger recesses. The receptacle is configured to receive the one or more keys of the backplate in the one or more hanger recesses such that the one or more triggers are actuated by engagement with the one or more keys and relative movement between the backplate and the receptacle. The receptacle is physically secured to the backplate via engagement with the one or more keys.

Embodiments of the disclosure may also provide a method for installing an alarm unit on a wall. The method includes rotationally locking a backplate with the wall using one or more screws, and sliding the alarm unit onto keys extending from the backplate. The method also includes moving the alarm unit relative to the backplate after sliding the alarm unit onto the backplate, such that at least one of the keys actuates a trigger to activate the alarm unit.

Embodiments of the disclosure may further provide a mounting assembly for an alarm unit. The mounting assembly includes a backplate including a rear face configured to be disposed against a wall. The backplate also includes a front face opposing the rear face, an outer diameter, and keys angularly spaced apart around the outer diameter and extending from the front face. The backplate defines a chamfered central opening therethrough and a plurality of secondary openings therethrough, with the plurality of secondary openings being positioned radially between the central opening and the outer diameter. The backplate further defines one or more recesses extending outward from the chamfered central opening. The mounting assembly also includes a primary fastener including one or more wedge-shaped ribs extending radially therefrom, with the primary fastener being configured to be received through the central opening and into the wall. The one or more wedge-shaped ribs are received in the one or more of the recesses when the primary fastener is received through the opening, such that the primary fastener is configured to lie substantially flush with the front face of the backplate and to transmit torque from the backplate to the wall via the one or more wedge-shaped ribs engaging the backplate in the one or more recesses.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Reference will now be made in detail to various embodiments of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific implementations in which may be practiced. These implementations are described in sufficient detail to enable those skilled in the art to practice these implementations and it is to be understood that other implementations may be utilized and that changes may be made without departing from the scope of the present teachings. The following description is, therefore, merely exemplary.

Generally, embodiments of the present disclosure may provide a mounting assembly for an alarm unit, which may promote fast installation in a variety of configurations to suit a variety of installation settings. Embodiments of the mounting assembly may also provide for automatic activation of the alarm unit as part of installation.

In an embodiment, the mounting assembly generally includes a primary fastener, such as a screw, and a backplate. The screw may include one or more ribs configured to transfer torque between the screw and the backplate. Further, the backplate may include one or more keys, configured to interlock with recesses formed in a receptacle of the alarm unit. The alarm unit may include one or more triggers, configured to actuate by engagement with one or more of the keys when the receptacle receives the keys and rotates with respect thereto. When actuated, the triggers may cause the alarm unit to activate.

Figure 1:
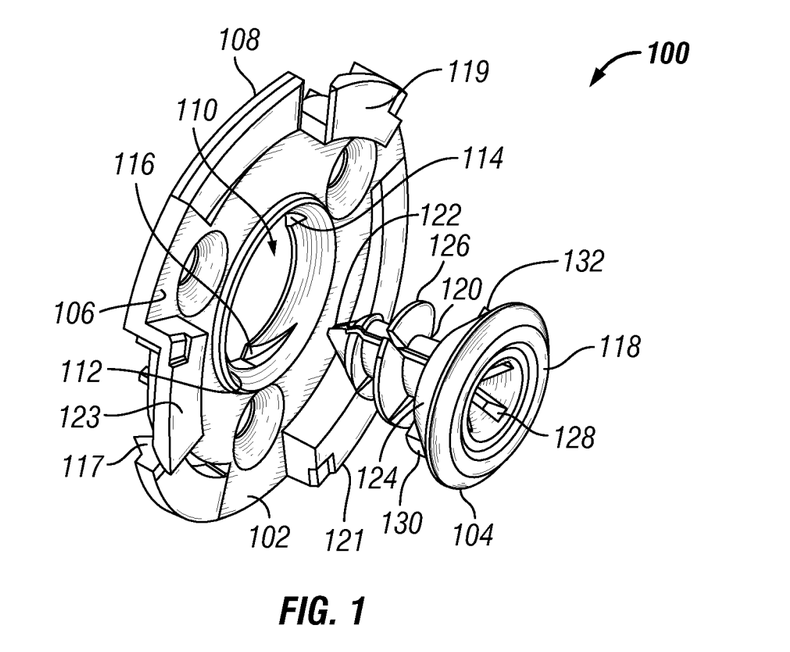
FIG. 1 illustrates an exploded perspective view of a mounting assembly, depicting a backplate and a primary fastener thereof, according to an embodiment.

Turning now to the specific, illustrative embodiments, FIG. 1 depicts an exploded perspective view of a mounting assembly 100, according to an embodiment. The mounting assembly 100 may, for example, be configured to mount to a ceiling or any other type of wall of a facility, such as a commercial, residential, or industrial building. As the term is used herein, "wall" is defined to include a ceiling or any other type of interior or exterior wall, as well as a floor, roof, ceiling, column, post, rafter, joist, stud, or any other surface suitable for securing an alarm unit thereto. The mounting assembly 100 may include a backplate 102 and a one or more mounting fasteners, e.g., a primary fastener 104. In the embodiment illustrated in FIG. 1, the primary fastener 104 is a threaded screw 104.

The backplate 102 may be generally circular, but may be other shapes in other embodiments, and may define a front face 106, a rear face 108 opposing the front face 106, and a central opening 110 extending therebetween. The central opening 110 may be cylindrical and defined proximal the center of the backplate 102, but in other embodiments may be defined at any other suitable location on the backplate 102. The central opening 110 may be chamfered, as shown, such that a surface 112 of the backplate 102 defining the central opening 110 extends at an angle. Accordingly, the central opening 110 may increase in diameter as proceeding from the rear face 108 toward the front face 106.

The surface 112 defining the central opening 110 may further define one or more recesses (e.g., a first recess 114 and a second recess 116), extending into the chamfered surface 112 of the backplate 102 and away from the central opening 110. In embodiments having two recesses 114, 116, the two recesses 114, 116 may be positioned approximately 180 degrees apart around the cylindrical central opening 110. Embodiments two other numbers of recesses are contemplated, and may be spaced equiangularly or according to any other suitable pattern. The recesses 114, 116 may extend partially around the central opening 110, for example, about 10 degrees, about 20 degrees, about 30 degrees, about 40 degrees, about 50 degrees, about 60 degrees, or any range therein.

The backplate 102 may also include one or more engaging protrusions 117, extending from the rear face 108. The engaging protrusions 117 may be pointed, and may extend normal to the rear face 108 or oblique thereto. The engaging protrusions 117 may be of sufficient thickness and strength so as to bite into the material of the wall when the backplate 102 is rotated relative thereto, as will be described in greater detail below.

Moreover, the backplate 102 may include raised keys 119, 121, 123. The raised keys 119, 121, 123 may extend from the front face 106 of the backplate 102 and may have a generally L-shaped profile, as shown. In an embodiment in which the backplate 102 is circular, the keys 119, 121, 123 may be disposed about or proximal to the outer diameter of the backplate 102. In an embodiment in which the backplate 102 is polygonal, the keys 119, 121, 123 may be disposed proximal the outer perimeter of the backplate 102. In other embodiments, the keys 119, 121, 123 may be disposed in any other suitable location on the backplate 102 (e.g., extending radially outward from the outer diameter). Further, although three keys 119, 121, 123 are shown, it will be readily appreciated that fewer or more keys may be employed without departing from the scope of the present disclosure.

Turning now to the screw 104, the screw 104 may have a head 118 and a shank 120. The shank 120 may have an increasing diameter as proceeding from a pointed distal tip 122 to a base 124 where the shank 120 meets the head 118. Further, the shank 120 may be threaded with threads 126, which may be relatively large, course threads, configured to grip soft material, such as, in one example, gypsum board (i.e., "drywall"). The major diameter of the screw 104 (i.e., the diameter of the outer reach of the threads 126) may be less than the smallest diameter of the central opening 110, such that the shank 120 is receivable through the central opening 110.

The head 118 may be angled, so as to be complementary in shape to the chamfered surface 112. Further, the head 118 may include slots 128, so as to receive a tool, such as a screwdriver, for forcing the screw 104 into the material of the wall to which the backplate 102 is to be secured. The screw 104 may also include one or more ribs, for example, a first rib 130 and a second rib 132, which may be positioned approximately 180 degrees apart around the shank 120, proximal the base 124. The first rib 130 may be positioned to be received into either of the first or second recesses 114, 116 of the surface 112, while the second rib 132 is received into the remaining recess 114, 116. Embodiments with additional numbers of ribs are contemplated, and, in such embodiments, the ribs may be equiangularly separated or separated according to any other suitable pattern. Further, the number of ribs may be the same as the number of recesses, but in other embodiments, fewer or more recesses than ribs may be employed.

Additionally, some or all of the backplate 102 may be made from any suitable material, such as a plastic (e.g., nylon 66, polyoxymethylene, or other thermomechanically similar materials), one or more metals (e.g., aluminum, steel, etc.), combinations thereof, or the like. Further, the backplate 102 may be of unitary construction, e.g., molded, cast, sintered, etc., from a single material, or may include a base and one or more inlays, buttons, or attached fixtures (e.g., the engaging protrusions 117). Similarly, the screw 104 may be made (e.g., molded, cast, forged, sintered, etc.) from a similar material. For example, in some embodiments, the material of the screw 104 may be the same as the material used for the backplate 102. In other embodiments, however, it may be advantageous to use a different, e.g., harder, material for the screw 104.

When installed, according to an embodiment, the screw 104 and the backplate 102 may provide an interlocking engagement therebetween, while the screw 104 engages and bites into the material to which the backplate 102 is to be mounted, thereby providing a secure connection to the wall. Accordingly, in an embodiment, the backplate 102 may be positioned, e.g., pressed by hand, against the wall. The distal tip 122 of the screw 104 may then be received through the central opening 110 and the screw 104 rotated, e.g., by a screwdriver engaging the slots 128, relative the backplate 102 and/or the wall, thereby driving the screw 104 into the wall. Alternatively, the screw 104 may be received into the central opening 110, and the backplate 102 and screw 104 may be rotated together as the screw 104 is driven into the wall. It will be appreciated that, although an embodiment in which a screwdriver engages slots 128 in the screw 104 is described, this is not to be considered limiting as any mechanism by which the screw 104 is rotated may be employed. For example, the head 118 may have flats, which may be engaged by a wrench.

Once the head 118 moves into proximity of the backplate 102, the ribs 130, 132 may slide into the recesses 114, 116. The ribs 130, 132 may slide in the recesses 114, 116 until reaching an end of the recesses 114, 116, where the ribs 130, 132 may bear on the end of the recesses 114, 116 and thus be prevented from further translation therein. The backplate 102 may thus be urged to move with the screw 104 as the screw 104 continues to rotate the last distance into the wall, by the engagement between the ribs 130, 132 and the recesses 114, 116. As the backplate 102 rotates, the engaging protrusions 117 may bite into the wall, providing an additional venue for force transfer between the backplate 102 and the wall.

When sufficiently tightened, the screw 104 may lie substantially flush (i.e., the end of the head 118 may be level with) the front face 106 and provide an anchor against sheer forces, by holding the backplate 102 against the wall. In addition, the screw 104 may provide an anchor against torsional forces, as torsional forces on the backplate 102 may be transferred to the screw 104 via the ribs 130, 132. In at least one example, so long as the ribs 130, 132 do not bend or yield, and the screw 104 remains securely implanted in the material of the wall, the backplate 102 may resist rotation under an application of a torsional force.

Figure 2:
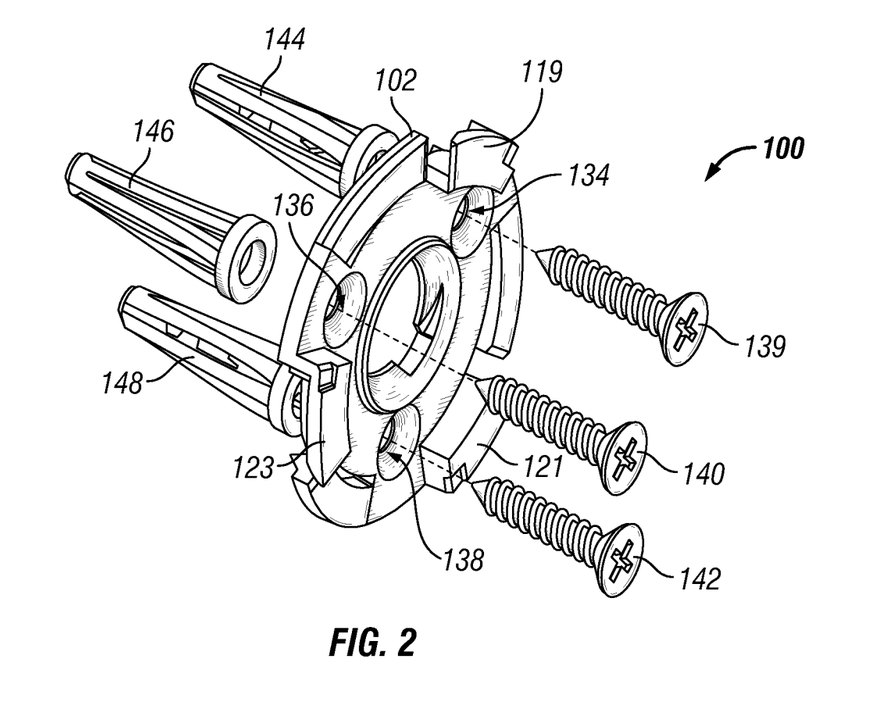
FIG. 2 illustrates an exploded perspective view of the mounting assembly, depicting the backplate thereof receiving a plurality of secondary fasteners, according to an embodiment.

FIG. 2 illustrates another exploded perspective view the mounting assembly 100, according to an embodiment. In addition to the central opening 110, the backplate 102 may include a plurality of secondary openings (three are shown: 134, 136, 138), which may be positioned at angular intervals with respect to the center of the backplate 102. The secondary openings 134-138 may extend normal to the backplate 102, between the front face 106 and the rear face 108. Further, the secondary openings 134-138 may be offset from the central opening 110, so as to be radially outside of the central opening 110. Like the central opening 110, the secondary openings 134-138 may be chamfered, so as to receive fasteners generally flush with the front face 106. In the illustrated embodiment, the fasteners may be screws 139, 140, 142, one each for each of the secondary openings 134-138.

The screws 139-142 may each be received through the secondary openings 134-138, so as to, for example, secure the backplate 102 to a relatively hard material (e.g., wood, metal, concrete, masonry, etc.). In some embodiments, the mounting assembly 100 may also include anchors 144, 146, 148, one for each of the screws 139-142, for example. The anchors 144-148 may be drywall or masonry anchors, which may be configured to be received into a pre-drilled hole in the wall. The screws 139-142 may each be received into one of the anchors 144-148, and, as the screws 139-142 are so received, the anchors 144-148 may expand radially outwards so as to secure to the wall. It will be readily-appreciated that in a given installation, one or more of the screws 139-142 may be received directly into the wall, while one or more of the screws 139-142 are received into anchors 144-148.

Accordingly, the backplate 102 may provide at least two configurations for securing to the wall. Further, in some embodiments, these configurations may be combinable, e.g., by using both the screw 104 and the screws 139-142 together, to provide additional anchoring. In some embodiments, the use of the screw 104 may be a primary securing configuration, while the screws 139-142 may be provided in the case that the screw 104 fails or unexpectedly lands on an area of increased hardness (e.g., a stud).

Figure 3A:
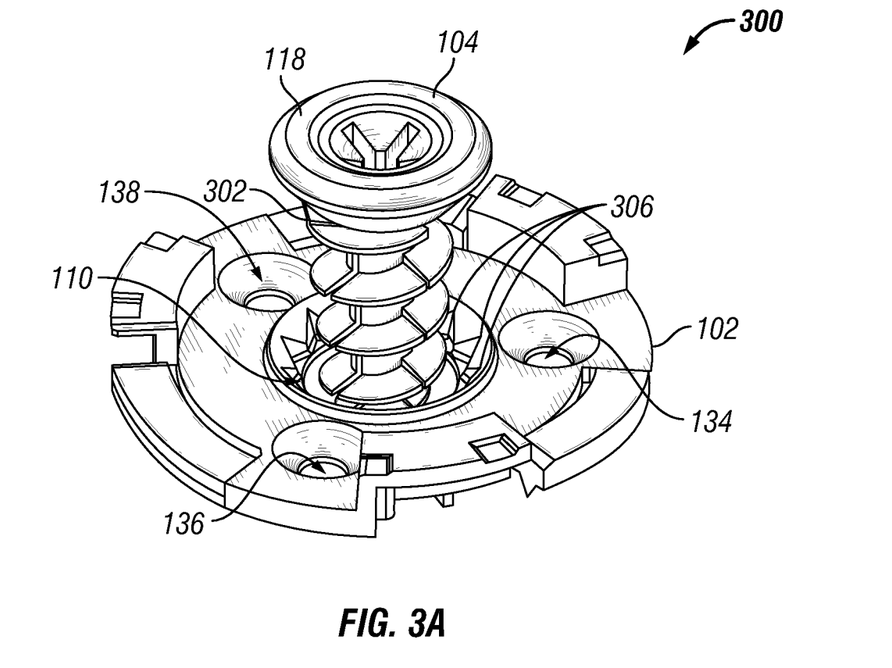
FIGS. 3A and 3B illustrate raised and lowered perspective views, respectively, of another embodiment of the mounting assembly.
Figure 3B:
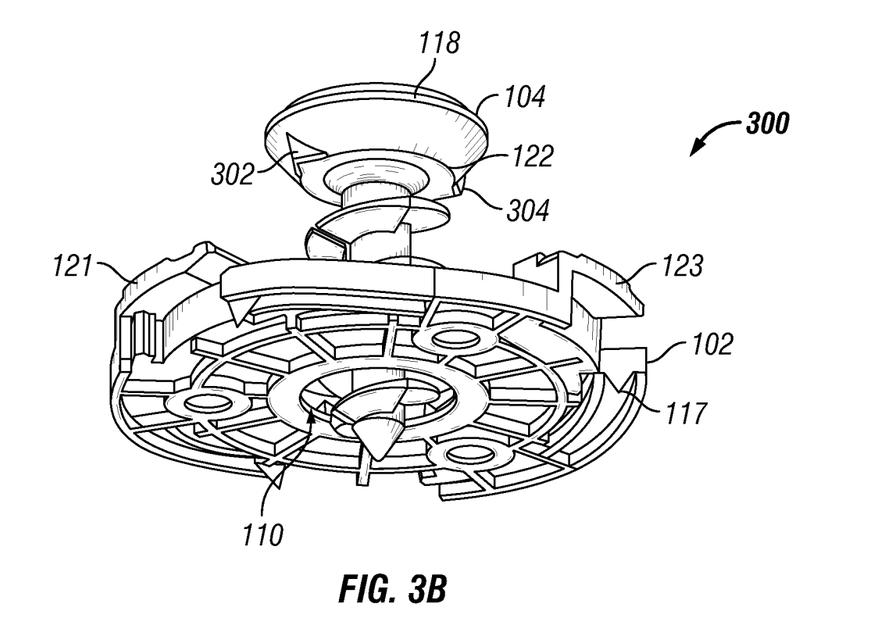

FIGS. 3A and 3B illustrate raised and lowered perspective views of another mounting assembly 300, according to an embodiment. The mounting assembly 300 may be similar in structure and function to the mounting assembly 100; therefore, like elements are indicated with like reference numerals and will not be described in duplicate herein.

In the mounting assembly 300, the screw 104 may include one or more wedge or tooth-shaped ribs (two are shown: 302, 304), rather than the generally rectangular cross-section ribs 130, 132 of the mounting assembly 100. The ribs 302, 304 may be angularly separated around the screw 104 by approximately 180 degrees, as shown. However, in some embodiments, a continuous array of such ribs 302, 304 may extend around the head 118 of the screw 104.

The backplate 102 of the mounting assembly 300 may include an array of tooth-shaped recesses 306, extending into the chamfered surface 112 and around and away from the central opening 110. The recesses 306 may each be sized to receive one of the ribs 302, 304. Accordingly, when the screw 104 is received through the central opening 110, the ribs 302, 304 may each be received into one of the recesses 306, thereby providing an interlocking relationship, analogous to the enmeshing of teeth of two gears.

Various other embodiments for rotationally locking the backplate 102 to the screw 104 are contemplated herein. For example, the screw 104 may have a single rib formed by a square extending around and outward from the head 118 or the base 124. In such an embodiment, the central opening 110 may also be square, so as to receive the square rib of the screw 104 and thereby transfer torque therebetween. In various other embodiments, the head 118 itself may be polygonal (e.g., square), and received into a complementarily-shaped central opening 110. Further, in some embodiments, either with a polygonal head 118 or rib, the opening 110 may be star-shaped, so as to bear against corners of the polygonal head 118 or rib (or both). Further still, in some embodiments, the head 118 or a rib portion thereof may be elliptical, and at least a portion of the opening 118 can also be elliptical. Accordingly, the elliptical portion of the screw 104 can be received by the elliptical portion of the central opening 110 so as to transfer torque therebetween.

Figure 4:
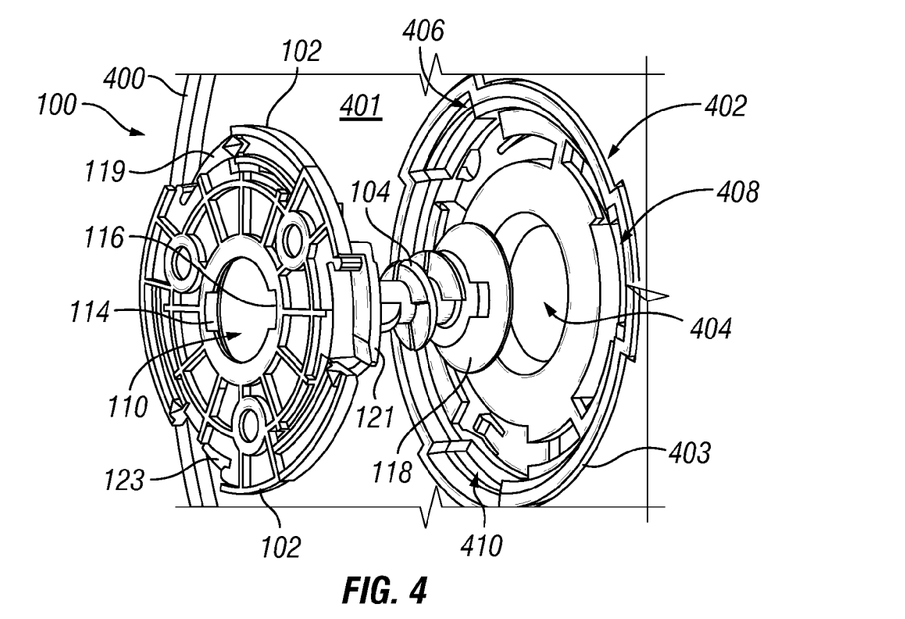
FIG. 4 illustrates an exploded perspective view of the mounting assembly and an alarm unit, according to an embodiment.

FIG. 4 illustrates a perspective view of the mounting assembly 100 and the back of an alarm unit 400, according to an embodiment. The alarm unit 400 may be any suitable type of alarm unit and may be configured to detect smoke, fire, carbon monoxide, other gases or compounds, or the like. In at least one embodiment, the alarm unit 400 may include a sealed compartment for housing an extended-life battery.

The alarm unit 400 may include a casing 401, which may protect internal circuitry and house the power supply. As shown, the screw 104 may be received through the central opening 110 of the backplate 102, so as to secure the backplate 102 to a wall. Further, when fully-received, the screw 104 may lay flush with the front face 106 of the backplate 102, e.g., by bearing against the chamfered surface 112.

The mounting assembly 100 may include a coupling receptacle 402 mating with and engaging the backplate 102, so as to secure the alarm unit 400 thereto. The coupling receptacle 402 may be integral with the casing 401 of the alarm unit 400, but, in other embodiments, may be a separate piece adhered, welded, fastened, or otherwise secured to the casing 401. In some cases, the receptacle 402 may be characterized as part of the alarm unit 400, rather than as part of the mounting assembly 100, or even as part of both. Furthermore, regardless of whether the receptacle 402 is integral with, adhered to, welded to, fastened to, or otherwise secured to the casing 401 of the alarm unit 400, the receptacle 402 may be characterized as being "coupled" thereto, as the term is used herein.

The coupling receptacle 402 may include an outer rim 403 and plurality of recesses. For example, the coupling receptacle 402 may include a central recess 404, sized to fit around the head 118 of the screw 104 and/or bear on the backplate 102 surrounding the central opening 110. Accordingly, the central recess 404 may allow for cases in which the screw 104 (when used) is not entirely flush with the front face 106 (e.g., FIG. 1). The receptacle 402 may also include a plurality of hanger recesses (three shown: 406, 408, 410), which may be defined radially outward from the outer rim 403 and into the casing 401. The number and position of the hanger recesses 406, 408, 410 included may be determined according to the number and position of the keys 119, 121, 123. Further, the hanger recesses 406, 408, 410 may be sized so as to receive the keys 119, 121, 123.

The alarm unit 400 may also include one or more triggers (one shown: 412). The trigger 412 may be disposed within at least one of the hanger recesses 406, 408, 410 and positioned to engage one of the keys 119, 121, 123 upon installation of the alarm unit 400. Furthermore, the trigger 412 may be electrically connected to the internal circuitry of the alarm unit 400. When actuated, the trigger 412 may cause the alarm unit 400 to power on and begin operating.

Figure 5:
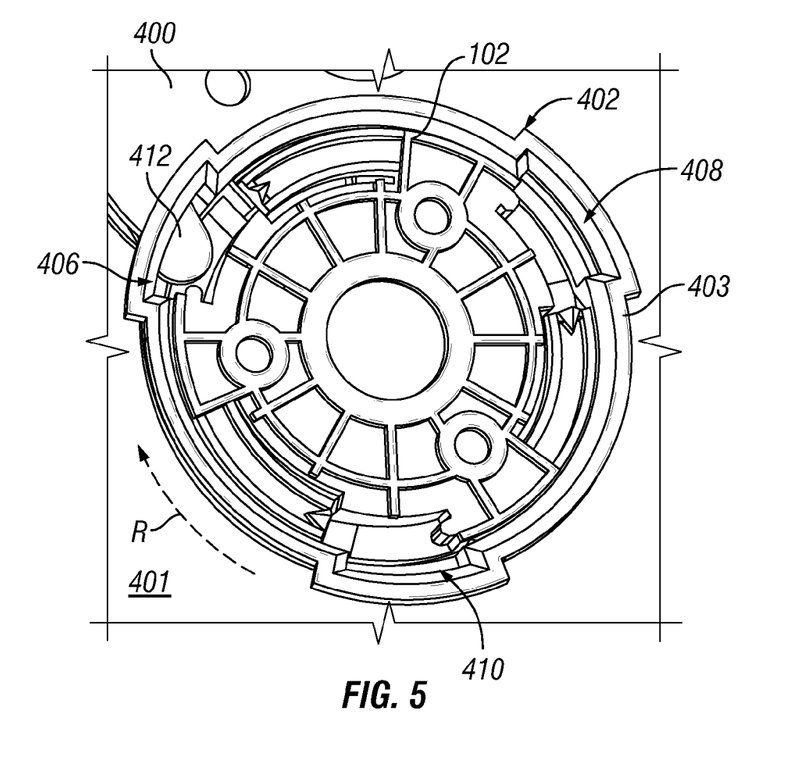
FIG. 5 illustrates a perspective view of the backplate of the mounting assembly secured to the alarm unit, according to an embodiment.

When installing the alarm unit 400 on the backplate 102 of the mounting assembly 100, the alarm unit 400 may be slid onto the backplate 102, such that the keys 119, 121, 123 are received into the hanger recesses 406, 408, 410. In some embodiments, especially where the backplate 102 and receptacle 402 are circular, the alarm unit 400 may then be rotated, relative to the backplate 102, e.g., in a circumferential direction R, such that the L-shaped keys 119, 121, 123 extend at least partially under the outer rim 403, so as to interlock with the receptacle 402. During such rotating (or even while initially sliding the alarm unit 400 onto the backplate 102), one or more of the keys 119, 121, 123 may actuate the trigger 412, powering on (i.e., "activating") the alarm unit 400.

In other embodiments, such actuation of the trigger 412 may proceed by sliding, e.g., laterally sliding, the alarm unit 400 relative the backplate 102, or vice versa. For example, the receptacle 402 may receive a polygonal backplate 102, such that the keys 119, 121, 123 are received in the hanger recesses 406, 408, 410. Then the receptacle 402 may be slid laterally with respect to the backplate 102, such that one or more of the keys 119, 121, 123 engages the trigger 412, so as to activate the alarm unit 400.

Further, it will be appreciated that such mechanical activation of the alarm unit 400 is but one embodiment among many contemplated herein. For example, activation may also be achieved electrically, e.g., by the backplate 102 providing contacts, magnets, etc. for completing a circuit in the alarm unit 400. However, a variety of electrical activation devices, processes, etc., will be apparent to one with skill in the art according to the present disclosure.

Figure 6:
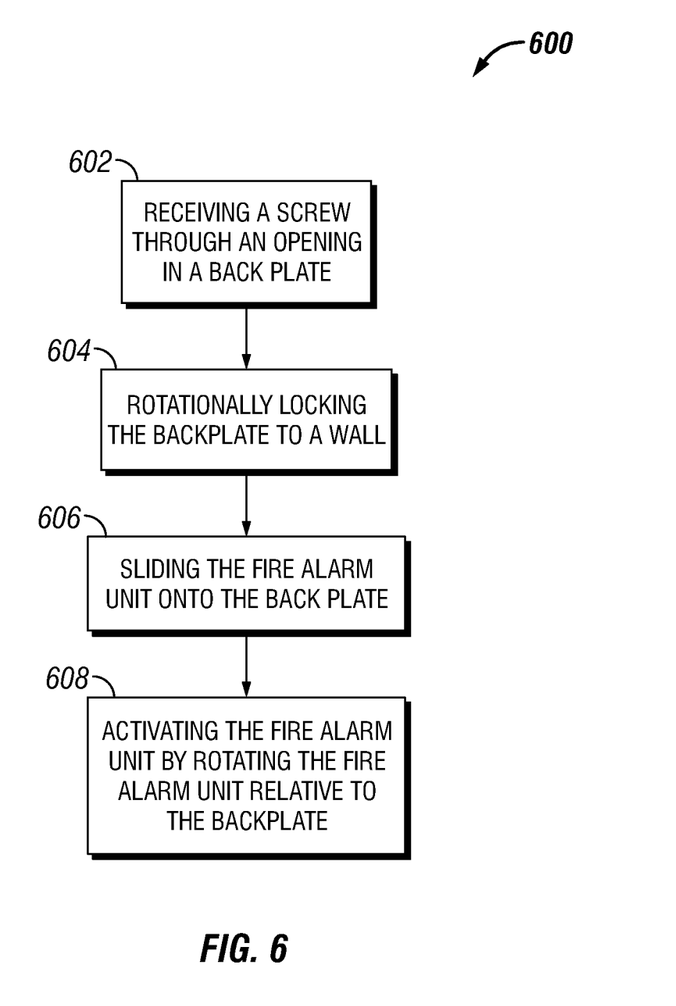
FIG. 6 illustrates a flowchart of a method for installing an alarm unit, according to an embodiment.

FIG. 6 illustrates a flowchart of a method 600 for installing an alarm unit on a wall, according to an embodiment. The method 600 may proceed by operation of one or more of the mounting assembly embodiments 100 and/or 300, as well as the alarm unit 400, discussed above with reference to FIGS. 1-5, and may thus be best understood with reference thereto.

The method 600 may include receiving a screw through an opening defined in a backplate 102, as at 602. It will be appreciated that such screw may be the screw 104, or one or more screws 139-142, or both, as described above. The method 600 may also include rotationally locking the backplate 102 to the wall, as at 604. Such rotational locking may proceed by locking the screw 104 with the backplate 102 (e.g., using ribs 130, 132, 302, 304, or any subset thereof), or by receiving multiple screws 139-142 at angularly offset positions along the backplate 102, or both. Further, such rotational locking may proceed by driving the screw(s) 104 and/or 139-142 into the wall. In various embodiments, the screw 104 and/or screws 139-142 may be partially driven into the wall first, and then received through opening(s) 110 and/or 134-138 in the backplate 102, or vice versa, with the screw(s) 104 and/or 139-142 being received through the opening(s) 110 and/or 134-138 and then driven into the wall.

The method 600 may also include sliding the alarm unit 400 onto the backplate 102, as at 606. For example, the hanger recesses 406, 408, 410 may be aligned with the keys 119, 121, 123, such that the keys 119, 121, 123 slide into the recesses 406, 408, 410. The method 600 may then proceed to activating the alarm unit 400 by rotating or sliding the alarm unit 400 relative to the backplate 102, e.g., in a direction R (FIG. 5), as at 608. This may result in the recesses 406, 408, 410 sliding under the outer rim 403, so as to interlock with the receptacle 402, thereby securing the alarm unit 400 to the backplate 102 and thus the wall. At the same time, one or more of the keys 119, 121, 123 may slide into engagement, by the relative rotation or sliding movement of the alarm unit 400 with respect to the backplate 102, so as to move the trigger 412. The trigger 412 may be electrically connected to the internal circuitry of the alarm unit 400, which may be powered on or "activated" by the actuation of the trigger 412.

While the present teachings have been illustrated with respect to one or more implementations, alterations and/or modifications may be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings.

It will be appreciated that structural components and/or processing stages may be added or existing structural components and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein.

The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side," "higher," "lower," "over," "top," and "under" are defined with respect to the conventional plane or working surface being on the top surface of the workpiece, regardless of the orientation of the workpiece.

What is claimed is:

1. A mounting assembly for an alarm unit, comprising:
a backplate comprising a front face and one or more keys extending from the front face, the backplate being configured to be secured to a wall; and
a receptacle comprising one or more triggers electrically connected to an internal power source of the alarm unit, and defining one or more hanger recesses, the receptacle being configured to receive the one or more keys of the backplate in the one or more hanger recesses such that the one or more triggers are actuated by engagement with the one or more keys and relative movement between the backplate and the receptacle, wherein the receptacle is physically secured to the backplate via engagement with the one or more keys;
wherein upon the one or more triggers being actuated by engagement with the one or more keys, the alarm unit is powered on by the internal power source.

2. The mounting assembly of claim 1, further comprising one or more screws, wherein the backplate defines one or more openings for receiving the screws, such that the one or more screws are configured to rotationally lock the backplate to the wall.

3. A mounting assembly for an alarm unit, comprising:
a backplate comprising a front face and one or more keys extending from the front face, the backplate being configured to be secured to a wall;
a receptacle comprising one or more triggers electrically connected to a power source of the alarm unit, and defining one or more hanger recesses, the receptacle being configured to receive the one or more keys of the backplate in the one or more hanger recesses such that the one or more triggers are actuated by engagement between the one or more keys and relative movement between the backplate and the receptacle, wherein the receptacle is physically secured to the backplate via engagement with the one or more keys; and
a screw comprising an angled head and one or more outwardly-extending ribs, wherein backplate comprises a chamfered surface at least partially defining an opening through the backplate and one or more recesses extending outward from opening and at least partially in the chamfered surface, the opening being configured to receive the screw and the one or more recesses being configured to receive the one or more ribs to rotationally lock the screw and the backplate.

4. The mounting assembly of claim 3, wherein the one or more ribs of the screw have a wedge-shaped profile.

5. The mounting assembly of claim 1, wherein the backplate is circular and the one or more keys are disposed proximal an outer diameter of the backplate.

6. The mounting assembly of claim 1, wherein the backplate defines a central opening, one or more recesses extending from the central opening, and a plurality of secondary openings defined radially between the central opening and an outer diameter of the backplate, the plurality of secondary openings and being angularly spaced apart.

7. A mounting assembly for an alarm unit, comprising:
a backplate comprising a front face and one or more keys extending from the front face, the backplate being configured to be secured to a wall; and
a receptacle comprising one or more triggers electrically connected to a power source of the alarm unit, and defining one or more hanger recesses, the receptacle being configured to receive the one or more keys of the backplate in the one or more hanger recesses such that the one or more triggers are actuated by engagement with the one or more keys and relative movement between the backplate and the receptacle, wherein the receptacle is physically secured to the backplate via engagement with the one or more keys;
wherein the backplate further comprises an engaging protrusion extending from a rear face of the backplate, wherein the engaging protrusion 1s configured to bite into the wall to which the backplate is configured to be secured.

8. The mounting assembly of claim 1, wherein the one or more keys are L-shaped so as to extend into the one or more hanger recesses and interlock with the receptacle by relative movement between the receptacle and the backplate.

9. A mounting assembly for an alarm unit, comprising:
a backplate comprising a rear face configured to be disposed against a wall, a front face opposing the rear face, an outer diameter, and keys angularly spaced apart around the outer diameter and extending from the front face, the backplate defining a chamfered central opening therethrough and a plurality of secondary openings therethrough, the plurality of secondary openings being positioned radially between the central opening and the outer diameter, the backplate further defining one or more recesses extending outward from the chamfered central opening; and
a primary fastener composing one or more wedge-shaped ribs extending radially therefrom, the primary fastener being configured to be received through the central opening and into the wall, wherein the one or more wedge-shaped ribs are received in the one or more of the recesses when the primary fastener is received through the opening, such that the primary fastener is configured to lie substantially flush with the front face of the backplate and to transmit torque from the backplate to the wall via the one or more wedge-shaped ribs engaging the backplate in the one or more recesses.

10. The mounting assembly of claim 9, wherein the one or more keys are configured to engage one or more triggers of a receptacle to activate the alarm unit.

11. The mounting assembly of claim 9, wherein the one or more keys are L-shaped and are configured to be received into one or more hanger recess of a receptacle coupled with the alarm unit.

12. The mounting assembly of claim 11, wherein, when the alarm unit is rotated, slid, or both relative to the backplate, the one or more keys are each configured to interlock with an outer rim of the receptacle so as to secure a connection between the alarm unit and the backplate.

\* \* \* \* \*